United States Patent
Buechner et al.

(10) Patent No.: US 12,421,434 B2
(45) Date of Patent: Sep. 23, 2025

(54) ADHESIVES

(71) Applicant: Covestro Deutschland AG, Leverkusen (DE)

(72) Inventors: Joerg Buechner, Bergisch Gladbach (DE); Harald Kraus, Leverkusen (DE); Thomas Fait, Cologne (DE); Wolfgang Arndt, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 126 days.

(21) Appl. No.: 18/290,175

(22) PCT Filed: May 9, 2022

(86) PCT No.: PCT/EP2022/062390
§ 371 (c)(1),
(2) Date: Nov. 10, 2023

(87) PCT Pub. No.: WO2022/238279
PCT Pub. Date: Nov. 17, 2022

(65) Prior Publication Data
US 2024/0254375 A1   Aug. 1, 2024

(30) Foreign Application Priority Data
May 12, 2021   (EP) .................... 21173508

(51) Int. Cl.
| | |
|---|---|
| C09J 175/04 | (2006.01) |
| C08G 18/08 | (2006.01) |
| C08G 18/28 | (2006.01) |
| C08G 18/42 | (2006.01) |
| C08G 18/70 | (2006.01) |
| C08G 18/72 | (2006.01) |
| C09J 7/00 | (2018.01) |
| C09J 175/02 | (2006.01) |

(52) U.S. Cl.
CPC ........ *C09J 175/04* (2013.01); *C08G 18/0828* (2013.01); *C08G 18/0866* (2013.01); *C08G 18/283* (2013.01); *C08G 18/4238* (2013.01); *C08G 18/706* (2013.01); *C08G 18/722* (2013.01); *C09J 7/00* (2013.01); *C09J 175/02* (2013.01); *C08G 2170/80* (2013.01); *C08G 2250/00* (2013.01)

(58) Field of Classification Search
CPC .... C08G 18/0866; C08G 18/706; C08L 75/06
See application file for complete search history.

(56) References Cited

U.S. PATENT DOCUMENTS

2015/0240128 A1 * 8/2015 Muvundamina ........ B32B 37/06
428/339

FOREIGN PATENT DOCUMENTS

| DE | 2446440 | | 4/1976 | |
|---|---|---|---|---|
| EP | 0916647 | A2 | 5/1999 | |
| EP | 0922720 | A1 | 6/1999 | |
| EP | 1134245 | A2 | 9/2001 | |
| EP | 1172390 | A1 | 7/2002 | |
| EP | 2209619 | B1 | 12/2019 | |
| EP | 3730528 | A1 * | 10/2020 | ......... C08G 18/0823 |
| EP | 3789448 | A1 | 3/2021 | |
| GB | 1462597 | | 1/1977 | |
| JP | 2005500418 | A * | 1/2005 | |

OTHER PUBLICATIONS

English machine translation EP3730528 (Year: 2020).*
English machine translation of JP2005500418 (Year: 2005).*

* cited by examiner

*Primary Examiner* — Scott W Dodds
(74) *Attorney, Agent, or Firm* — Richard P. Bender; Christian E. Schuster

(57) ABSTRACT

The present disclosure relates to an aqueous dispersion containing at least one semicrystalline polyurethane-polyurea polymer and at least one surface-deactivated polyisocyanate. The melting temperature of the semicrystalline polyurethane-polyurea polymer is at least 55° C. The disclosure also relates to a process for preparing the aqueous dispersion, the use of the aqueous dispersion for producing coated substrates or adhesive films, flat or three-dimensional substrates coated with the aqueous dispersion, a substrate coated with at least one semicrystalline polyurethane-polyurea polymer and at least one surface-deactivated polyisocyanate, an adhesive film including at least one semicrystalline polyurethane-polyurea polymer and at least one surface-deactivated polyisocyanate, and a dried adhesive film obtained from such an aqueous dispersion.

12 Claims, No Drawings

ADHESIVES

CROSS-REFERENCE TO RELATED APPLICATIONS

This application is the United States national phase of International Application No. PCT/EP2022/062390 filed May 9, 2022, and claims priority to European Patent Application No. 21173508.9 filed May 12, 2021, the disclosures of which are hereby incorporated by reference in their entireties.

BACKGROUND

Technical Field

The present invention relates to an aqueous dispersion containing at least one semicrystalline polyurethane-polyurea polymer and at least one surface-deactivated polyisocyanate, preferably at least one surface-deactivated solid polyisocyanate, wherein the melting temperature of the semicrystalline polyurethane-polyurea polymer is at least 55° C., to a process for preparing the aqueous dispersion, to the use of the aqueous dispersion for producing coated substrates or for producing adhesive films, to flat or three-dimensional substrates coated with the aqueous dispersion, to a substrate coated with at least one semicrystalline polyurethane-polyurea polymer and at least one surface-deactivated polyisocyanate, preferably at least one surface-deactivated solid polyisocyanate, wherein the melting temperature of the semicrystalline polyurethane-polyurea polymer is at least 55° C., to an adhesive film comprising at least one semicrystalline polyurethane-polyurea polymer and at least one surface-deactivated polyisocyanate, preferably at least one surface-deactivated solid polyisocyanate, characterized in that the melting temperature of the semicrystalline polyurethane-polyurea polymer is at least 55° C., and to a dried adhesive film obtained from such an aqueous dispersion.

Description of Related Art

It is known from the prior art to use polyurethanes having linear polymer chains which crystallize below 50° C. for heat-activated adhesive bonding of temperature-sensitive substrates. However, use without addition of a crosslinker achieves only low heat resistances correlating with the melting temperature of the polyester segments present in the polyols present. In addition, the hydrolysis resistance of the adhesive bond is insufficient for many applications in case of use without a crosslinker. For this reason such dispersion polymers are typically employed with additional use of hydrophilically modified polyisocyanates liquid at 23° C. However, the gain in improved properties comes at the cost of greater technical complexity for so-called two component (2K) use. The addition of the crosslinker component must be effected immediately prior to use of the dispersion. Furthermore the two-component use is prone to error in respect of addition of the correct amount of crosslinker component and homogenous incorporation thereof.

A customary "pot life" of such a two-component mixture is generally one to twelve hours. Furthermore, the dried adhesive layers must be used within about one to twelve hours, the so-called "open assembly time" since otherwise the advancing crosslinking reaction renders the polymer no longer sufficiently flowable to allow use under the customary conditions of heat-induced adhesive bonding.

The two-component mode of operation therefore has the disadvantage that the operating steps application of the dispersion/generation of the adhesive layer on the substrate surfaces to be bonded and the joining process are performable neither separately in time nor separately in space. However, such a separation would be economically advantageous and desirable for a multiplicity of applications.

Adhesive formulations comprising solid, finely divided isocyanates are known from the prior art. These so-called latently reactive dispersion adhesives are based on a dispersion containing an isocyanate-reactive polymer and finely divided solid isocyanate particles. Suitable solid isocyanates are in particular polyisocyanates having a melting/softening temperature of more than 40° C.

EP-A 1 172 390 discloses storage-stable, essentially aqueous, dispersions which contain deactivated isocyanates and isocyanate-reactive polymers and undergo crosslinking even at low temperatures. The crosslinking reaction commences after removal of the water at temperatures of 5° C. to 40° C. The aqueous dispersion preparations feature good storage stability. The disadvantage of this solution is that the coating produced from the dispersion is not storage stable since the crosslinking reaction commences with the drying of the layer. The desired separation in space and time of the processing steps adhesive application and joining process cannot be achieved with this operating procedure.

EP-A 1 134 245 describes storage-stable preparations of finely divided di- and polyisocyanate powders which may be directly incorporated into the aqueous isocyanate-reactive polymer dispersions without surface deactivation. In these formulations the crosslinking reaction is initiated by heating the dried layer to a temperature of at least 65° C. Here too, the coatings obtained from the formulations are not storage stable. The desired separation in space and time of the processing steps adhesive application and joining process cannot be achieved with this operating procedure either.

EP-A 0 922 720 discloses the use of aqueous dispersions which contain at least one surface-deactivated polyisocyanate and at least one isocyanate-reactive polymer for production of storage-stable latent-reactive layers or powders which may be crosslinked by heating. Polyisocyanates which may be employed include all aliphatic, cycloaliphatic, heterocyclic or aromatic isocyanates having a melting point above 40° C. According to this teaching the stability of the unreacted (latently reactive) systems (films or powders), the reaction temperature and the course of the reaction are determined by the type of the polyisocyanate, by the amount of the surface stabilizer, by the solubility parameter of the functionalized polymer and by catalysts, plasticizers and auxiliaries.

EP 2 209 619 A1 describes identification documents provided with a latently reactive adhesive layer. The process steps of adhesive application and bonding process are separated in time and space here. The drying of the aqueous latently reactive adhesive layer and the storage of the thermoplastic films provided with the reactive adhesive polymer are carried out at room temperature. The shelflife of the coated substrates is at least 21 days. The bonding process is preferably carried out at a temperature below 90° C.

There is a desire, for example in the automobile industry, to provide decorative films with reactive adhesive layers in a storage-stable manner, wherein the stability of the adhesive layers must also be ensured at temperatures markedly above 40° C. over a period of several months. The decorative films are to be provided with the reactive adhesive polymer for example in a temperate climate zone, for example Northern Europe, in order then to be adhesively bonded to a carrier material when required in a hotter climate zone, for example North Africa or Mexico. In order to be able to realize this manufacturing chain in economic fashion the decorative films provided with the reactive adhesive layer/the adhesive films must be able to be transported and stored without a cold chain.

SUMMARY

The present invention accordingly has for its object to provide an aqueous dispersion, in particular to form a latently reactive adhesive layer, a corresponding adhesive film or adhesive powder which are storage-stable at temperatures above 50° C. and which are able to be stored for example over several months at temperatures above 50° C. without onset of appreciable crosslinking of the adhesive polymer.

The object was achieved by the aqueous dispersion according to the invention containing at least one semicrystalline polyurethane-polyurea polymer and at least one surface-deactivated polyisocyanate, preferably at least one surface-deactivated solid polyisocyanate, wherein the melting temperature of the semicrystalline polyurethane-polyurea polymer is at least 55° C.

DESCRIPTION

The present invention relates to an aqueous dispersion containing at least one semicrystalline polyurethane-polyurea polymer. The semicrystalline polymers present in the disperse phase may be polyurethanes in the narrower sense, i.e. polymers obtained by polymerization of polyols and polyisocyanates, and/or may also be polymers which also employ as synthesis components mono- and/or diamines, optionally as chain extenders, to form urea groups. The dispersions that may be employed according to the invention are therefore referred to as aqueous polyurethane-polyurethaneurea dispersions.

According to the invention a polymer is referred to as semicrystalline or crystalline when it exhibits a melting peak in DSC measurement according to DIN 65467-1999-03 at a heating rate of 20 K/min. The melting peak is caused by the melting of regular substructures in the polymer. The melting temperature of the polymers/polymer layers obtained from the dispersions according to the invention is preferably 55° C. to 120° C., particularly preferably 55° C. to 100° C., very particularly preferably 55° C. to 90° C., in each case determined by DSC measurement according to DIN 65467-1999-03. The enthalpy of fusion of the polymers/polymer layers obtained from the dispersions according to the invention is generally >10 J/g, preferably >20 J/g, particularly preferably >25 J/g. The first heating is evaluated in each case in order to also detect polymers that crystallize slowly.

The present invention may generally be performed with any semicrystalline polyurethane-polyurea polymer appearing suitable to those skilled in the art and having an appropriate melting temperature.

The polyurethane-polyurea polymer employed according to the invention is preferably formed from A(i) at least one crystalline or semicrystalline difunctional polyester polyol having a number-average molecular weight of at least 400 g/mol and a melting temperature of at least 55° C., A(ii) optionally at least one difunctional polyol component having a number-average molecular weight of 62 to 399 g/mol, A(iii) at least one isocyanate component, A(iv) at least one isocyanate-reactive component bearing at least one ionic or potentially ionic group and A(v) optionally further isocyanate-reactive components.

It is preferable when the at least one semicrystalline polyurethane-polyurea polymer contains 50% to 95% by weight of constituent A(i), 0% to 10% by weight of constituent A(ii), 4% to 25% by weight of constituent A(iii), 0.5% to 10% by weight of constituent A(iv) and 0% to 30% by weight of constituent A(v), wherein the constituents sum to 100% by weight.

The at least one semicrystalline polyurethane-polyurea polymer preferably contains 65% to 92% by weight of constituent A(i), 0% to 5% by weight of constituent A(ii), 6% to 15% by weight of constituent A(iii), 0.5% to 5% by weight of constituent A(iv) and 0% to 25% by weight of constituent A(v), wherein the constituents sum to 100% by weight.

The at least one semicrystalline polyurethane-polyurea polymer particularly preferably contains 75% to 92% by weight of constituent A(i), 0% to 5% by weight of constituent A(ii), 8% to 15% by weight of constituent A(iii), 0.5% to 4% by weight of constituent A(iv) and 0% to 15% by weight of constituent A(v), wherein the constituents sum to 100% by weight.

The at least one semicrystalline polyurethane-polyurea polymer very particularly preferably contains 80% to 90% by weight of constituent A(i), 0% to 3% by weight of constituent A(ii), 8% to 14% by weight of constituent A(iii), 0.5% to 3% by weight of constituent A(iv) and 0% to 10% by weight of constituent A(v), wherein the constituents sum to 100% by weight.

Contemplated crystalline or semicrystalline difunctional polyester polyols A(i) especially include linear or else slightly branched polyester polyols based on dicarboxylic acids and/or derivatives thereof, such as anhydrides, esters or acid chlorides and preferably aliphatic linear polyols. Mixtures of dicarboxylic acids and/or derivatives thereof are also suitable. Suitable dicarboxylic acids are, for example, adipic acid, succinic acid, sebacic acid or dodecanedioic acid. Succinic acid, adipic acid and sebacic acid and mixtures thereof are preferred. These are used in amounts of at least 90 mol %, preferably of 95 to 100 mol %, based on the total amount of all carboxylic acids.

The difunctional polyester polyols A(i) can be prepared, for example, by polycondensation of dicarboxylic acids with polyols. The polyols preferably have a number-average molecular weight of at least 400 g/mol, consist of 2 to 12 carbon atoms, are preferably unbranched, difunctional and/or preferably have primary OH groups.

Examples of polyols which may be used for the preparation of the polyester polyols A(i) include polyhydric alcohols, for example ethanediol, di-, tri-, or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures of these.

Preferred polyol components for the polyester polyols A(i) are ethane-1,2-diol, butane-1,4-diol, hexane-1,6-diol and 1,4-dimethylolcyclohexane or mixtures of these.

The polyester polyols A(i) may be formed from one or more polyols. In a preferred embodiment of the present invention, they are formed from just one polyol.

If the crystalline or semicrystalline difunctional polyester polyols having a number-average molecular weight of at least 400 g/mol and a melting temperature of at least 60° C.

have a heat of fusion of at least 35 J/g, the polymer prepared using these will regularly have a heat of fusion of at least 25 J/g, preferably at least 35 J/g. If desired, adjustment of the heat of fusion of the polymer can be achieved by a slight modification of the content of polyester polyol A(i) in the composition or by a small variation of the heat of fusion of the polyester polyol. These measures require only exploratory experiments and are completely within the practical experience of a person of average skill in the art in this field.

The preparation of polyester polyols A(i) is known from the prior art.

The number-average molecular weight of the polyester polyols A(i) is preferably between 400 and 4000 g/mol, more preferably between 1000 and 3000 g/mol, particularly preferably between 1500 and 2500 g/mol, and very particularly preferably between 1800 and 2400 g/mol.

The melting temperature of the crystalline or semicrystalline polyester polyols A(i) is generally at least 55° C., preferably 60° C. to 100° C., particularly preferably 60° C. to 90° C. The heat of fusion is at least 35 J/g, preferably at least 40 J/g and particularly preferably at least 50 J/g.

Examples of difunctional polyol components having a molecular weight of 62 to 399 g/mol which are suitable as optionally present synthesis component A(ii) include the polyols mentioned for preparation of the polyester polyols A(i). Low molecular weight polyester diols, polyether diols, polycarbonate diols or other polymer diols are in principle also suitable, provided they have a molecular weight of 62 to 399 g/mol.

Suitable synthesis components A(iii) are any desired organic compounds having at least two free isocyanate groups per molecule. It is preferable to employ diisocyanates of general formula $Y(NCO)_2$, wherein Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms.

Preferred examples of corresponding diisocyanates are selected from the group consisting of tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate and mixtures thereof.

It is also possible to additionally use proportions of the higher-functionality polyisocyanates known per se in polyurethane chemistry, or else modified polyisocyanates known per se and for example comprising carbodiimide groups, allophanate groups, isocyanurate groups, urethane groups and/or biuret groups.

In addition to the simple diisocyanates mentioned, polyisocyanates containing heteroatoms in the radical linking the isocyanate groups and/or having a functionality of more than 2 isocyanate groups per molecule are also suitable according to the invention. The former are, for example, polyisocyanates which have been prepared by modification of simple aliphatic, cycloaliphatic, araliphatic and/or aromatic diisocyanates, are formed from at least two diisocyanates, and have a uretdione, isocyanurate, urethane, allophanate, biuret, carbodiimide, iminooxadiazinedione and/or oxadiazinetrione structure. One example of an unmodified polyisocyanate having more than 2 isocyanate groups per molecule is 4-isocyanatomethyloctane 1,8-diisocyanate (nonane triisocyanate).

Particularly preferred synthesis components A(iii) are selected from the group consisting of hexamethylene diisocyanate (HDI), 1-isocyanato-3,3,5-trimethyl-5-isocyanatomethylcyclohexane (IPDI) and mixtures thereof.

Preferred isocyanate-reactive components A(iv) bearing at least one ionic or potentially ionic group are mono- and dihydroxycarboxylic acids, mono- and diaminocarboxylic acids, mono- and dihydroxysulfonic acids, mono- and diaminosulfonic acids and also mono- and dihydroxyphosphonic acids or mono- and diaminophosphonic acids and alkali metal and ammonium salts thereof. Examples include dimethylolpropionic acid, dimethylolbutyric acid, hydroxypivalic acid, N-(2-aminoethyl)-β-alanine, N-(2-aminoethyl)-2-aminoethanesulfonic acid, N-(2-aminoethyl)-2-aminoethanecarboxylic acid, ethylenediaminepropyl- or -butylsulfonic acid, propylene-1,2- or -1,3-diamine-β-ethylsulfonic acid, malic acid, citric acid, glycolic acid, lactic acid, glycine, alanine, taurine, lysine, 3,5-diaminobenzoic acid, an addition product of IPDI and acrylic acid (see in this regard EP-A 0 916 647, Example 1) and the alkali metal and/or ammonium salts thereof; the adduct of sodium bisulfite onto but-2-ene-1,4-diol, polyethersulfonate, the propoxylated adduct of 2-butenediol and $NaHSO_3$, described, for example, in DE-A 2 446 440 (pages 5-9, formulae I-III). Well-suited for salt formation are hydroxides of sodium, potassium, lithium and calcium and tertiary amines such as triethylamine, dimethylcyclohexylamine and ethyldiisopropylamine. Other amines may also be used for salt formation, for example ammonia, diethanolamine, triethanolamine, dimethylethanolamine, methyldiethanolamine, aminomethylpropanol and also mixtures of the recited amines and also other amines. These amines are advantageously added only after the isocyanate groups have been largely converted.

Also suitable as component A(iv) are units convertible into cationic groups by addition of acids, such as N-methyldiethanolamine.

Particularly preferred components A(iv) are those having carboxyl and/or carboxylate and/or sulfonate groups.

Very particularly preferred components A(iv) are the sodium salts of N-(2-aminoethyl)-2-aminoethanesulfonic acid and of N-(2-aminoethyl)-2-aminoethanecarboxylic acid, in particular of N-(2-aminoethyl)-2-aminoethanesulfonic acid. Also very particularly preferred are the salts of dimethylolpropionic acid.

Isocyanate-reactive components A(v) may, for example, be polyoxyalkylene ethers containing at least one hydroxyl or amino group. The frequently used polyalkylene oxide polyether alcohols are obtainable in a manner known per se by alkoxylation of suitable starter molecules. Alkylene oxides suitable for the alkoxylation reaction are especially ethylene oxide and propylene oxide, which may be used in the alkoxylation reaction, individually or else together.

Further examples of isocyanate-reactive components A(v) are monoamines, diamines and/or polyamines, and mixtures thereof.

Examples of monoamines are aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine. Further examples are amino alcohols, i.e. compounds containing amino and hydroxyl groups in one molecule, for example ethanolamine, N-methylethanolamine, diethanolamine or 2-propanolamine. Examples of diamines are ethane-1,2-diamine, hexamethylene-1,6-diamine, 1-amino-3,3,5-trimethyl-5-aminomethylcyclohexane (isophoronediamine), piperazine, 1,4-diaminocyclohexane and bis(4-aminocyclohexyl)methane. Adipic dihydrazide, hydrazine and hydrazine hydrate are also suitable. Further examples are amino alcohols, i.e. compounds containing amino and hydroxyl groups in one molecule, for example 1,3-diamino-2-propanol, N-(2-hydroxyethyl)ethylenediamine or N,N-bis(2-hydroxyethyl)ethylenediamine. Examples of polyamines are diethylenetriamine and triethylenetetramine.

In a preferred form of the invention, the polymer according to the invention contains at least one monoamine and/or at least one diamine as isocyanate-reactive component A(v) for adjusting the molar mass.

The aqueous dispersion according to the invention further contains at least one surface-deactivated polyisocyanate, preferably at least one surface-deactivated solid polyisocyanate.

According to the invention it is possible to employ glassy, crystalline and/or (semi)crystalline solid isocyanates. Glassy, crystalline and/or (semi)crystalline solid isocyanates particularly suitable according to the invention have a melting/softening temperature of at least 30° C. determined by DSC measurement according to DIN 65467-1999-03.

Solid isocyanates preferred according to the invention include all aliphatic, cycloaliphatic and aromatic di- and polyisocyanates having a softening temperature of at least 55° C. According to the invention it is particularly preferable to employ dimerization and trimerization products of isophorone diisocyanate, obtainable for example as Desmodur® I, Covestro Deutschland AG, Leverkusen, bis(4-isocyanatocyclohexyl)methane, obtainable for example as Desmodur® W, Covestro Deutschland AG, Leverkusen, ω,ω'-diisocyanato-1,3-dimethylcyclohexane (H6XDI) and mixtures of these dimerization products and trimerization products and also mixed trimers of isophorone diisocyanate/bis(4-isocyanatocyclohexyl)methane, isophorone diisocyanate/hexamethylene diisocyanate, bis(4-isocyanatocyclohexyl)methane/hexamethylene diisocyanate, bis(4-isocyanatocyclohexyl)methane/ω,ω'-diisocyanato-1,3-dimethylcyclohexane, isophorone diisocyanate/ω,ω'-diisocyanato-1,3-dimethylcyclohexane.

Dimerization products of tolylene diisocyanate (TDI) are also preferred. Trimerization products of isophorone diisocyanate and dimerization products of tolylene diisocyanate are particularly preferred.

The aqueous dispersion according to the invention generally contains 15% to 60% by weight of the at least one semicrystalline polyurethane-polyurea polymer, 0.2% to 30% by weight of the at least one surface-deactivated polyisocyanate and 40% to 85% by weight of water, preferably 40% to 50% by weight of the at least one semicrystalline polyurethane-polyurea polymer, 2% to 10% by weight of the at least one surface-deactivated polyisocyanate and 50% to 60% by weight of water. In every case the amounts of the components present sum to 100% by weight.

In addition to the abovementioned components the aqueous dispersion according to the invention may contain additives selected from the group consisting of deactivation amines, thickeners, further usage-assisting additives, for example defoamers, and mixtures thereof.

The aqueous dispersion according to the invention is prepared by mixing a corresponding aqueous dispersion of the at least one polyurethane-polyurea polymer with the at least one surface-deactivated polyisocyanate, preferably at least one surface-deactivated solid polyisocyanate.

The present invention therefore further relates to a process for preparing the aqueous dispersion according to the invention at least comprising mixing an aqueous dispersion of the at least one polyurethane-polyurea polymer with at least one surface-deactivated polyisocyanate, preferably at least one surface-deactivated solid polyisocyanate, for example at room temperature.

The present invention preferably relates to the process according to the invention, wherein additives are additionally added. Suitable and preferred additives are known per se to those skilled in the art and are mentioned hereinabove.

The aqueous dispersion according to the invention may be applied to, for example flat or three-dimensional, substrates in any desired manner, for example by spray, doctor blade, brush or roller application methods. Drying affords storage-stable latently reactive coatings which may be stored at 50° C. over longer periods without occurrence of a crosslinking reaction that impedes or precludes the subsequent joining process. These adhesive layers allow the operating steps adhesive application and joining process to be separated from one another in space and time. Corresponding flat or three-dimensional substrates are for example furniture fronts, electronic articles and automotive interior parts.

The present invention therefore also relates to the use of the aqueous dispersion according to the invention for producing coated, in particular flat or three-dimensional, substrates.

The present invention further relates to flat or three-dimensional substrates coated with the aqueous dispersion according to the invention, for example release liners.

Release liners are known per se to those skilled in the art. A release liner is generally a substrate on which the aqueous dispersion according to the invention is applied. After application and drying of the adhesive on the release liner, i.e. after formation of an adhesive layer, the release liner may be peeled off/residuelessly separated from the adhesive again. The use of release liners makes it possible to produce "self-supporting" adhesive films according to the invention. It is preferable when the construction of the release liner according to the invention is release liner/adhesive/release liner.

Drying of this coating affords a substrate which is coated with at least one semicrystalline polyurethane-polyurea polymer and at least one surface-deactivated polyisocyanate, preferably at least one surface-deactivated solid polyisocyanate, wherein the melting temperature of the semicrystalline polyurethane-polyurea polymer is at least 55° C.

The present invention therefore also relates to a substrate which is coated with at least one semicrystalline polyurethane-polyurea polymer and at least one surface-deactivated polyisocyanate, preferably at least one surface-deactivated solid polyisocyanate, wherein the melting temperature of the semicrystalline polyurethane-polyurea polymer is at least 55° C.

The aqueous dispersion according to the invention may be applied for example to a release paper, for example silicone paper, paper provided with a polyolefinic nonstick coating or similar carrier materials, in a spray, doctor blade, brush or roller application method. Drying affords self-supporting, latently reactive films or nonwovens that, optionally after insertion of a release paper, may be rolled up and stored until use as an adhesive film.

The present invention further relates to the use of the aqueous dispersion according to the invention for producing adhesive films.

Adhesive films are known per se to those skilled in the art and described for example in EP 1 134 245 A. Typical dimensions of such adhesive films and processes for producing corresponding adhesive films are likewise known to those skilled in the art.

The present invention further relates to an adhesive film comprising at least one semicrystalline polyurethane-polyurea polymer and at least one surface-deactivated polyisocyanate, preferably at least one surface-deactivated solid polyisocyanate, characterized in that the melting temperature of the semicrystalline polyurethane-polyurea polymer is at least 55° C.

Details and preferred embodiments of the at least one semicrystalline polyurethane-polyurea polymer and the at least one surface-activated polyisocyanate are described hereinabove and apply correspondingly here.

The present invention further relates to a dried adhesive film, for example a release liner, obtained from the aqueous dispersion according to the invention, preferably by the process described in this text or by a process known to those skilled in the art, for example described in EP 1 134 245 A.

The present invention will now be elucidated by reference to examples.

EXAMPLES

Definition of Terms and Methods

Melting Temperature:

The melting temperature (Tm) was determined by DSC (differential scanning calorimetry). The melting temperature is the temperature at which the melting peak in the DSC diagram reaches its maximum. The heating rate during measurement was 20 K/min unless otherwise stated. The reported melting points are the values from the 1st heating. To determine the melting temperature and the enthalpy of fusion of the dried polymers of the polyurethane dispersions, dried polymer films were in each case produced by pouring the dispersions into Teflon dishes with subsequent seven-day drying at room temperature. Pieces having a mass of 10 mg were cut out of these films and placed in DSC crucibles which were then sealed with lids in the crucible sealing press. The crucibles were placed at RT into the measuring cell of the calorimeter and cooled to −100° C. This was followed by three heatings in the temperature range from −100° C. to +150° C. The heating rate was 20 K/min and between the first and second heating run cooling at 320 K/min, and between the second and third run at 20 K/min, was effected. The thermal coupling of the cooling block and the measuring cell was effected by purging with nitrogen and the measuring cell was cooled with a compressor. The melting temperature and the enthalpy of fusion were determined using the first heating. The instrument used was a Pyris Diamond DSC calorimeter from Perkin-Elmer.

Glass Transition Temperature:

The glass transition temperature (Tg) characterizes the temperature range in which a substance passes from the glassy state into the viscoelastic state. Measurement was carried out by DSC (differential scanning calorimetry). The change in the specific heat (Cp) in the glass transition causes a step (glass step) in the DSC diagram. The glass transition temperature is defined as the point of inflection in the glass step in the DSC diagram. Unless otherwise stated, measurement was effected at a heating rate of 20 K/min.

Oscillation Rheometry:

The polymer sample was inserted into the temperature-controlled measurement unit of the oscillation rheometer (ARES, TA Instruments) and subjected to sinusoidal deformation on one side (frequency=1 Hz). The phase shift of the sinusoidal deformation upon conduction through the polymer sample was registered. From the phase distribution and the complex shear modulus G*, the elastic proportion=storage modulus G' and the friction-based proportion G" may be calculated, in each case in Pa.

All samples were measured at 120° C. and a frequency of 1 Hz. The measured values were recorded at time intervals of 20 seconds. The arithmetic average was calculated from the values for the storage modulus G' recorded in the first 60 seconds after commencement of measurement.

If the arithmetic average of the storage modulus G' increases by more than 200% during storage of the reactive polymer samples, the sample is considered not storage stable.

Raw Materials/Products Used:

Dispercoll® BL XP 2514:
Aqueous suspension of surface-deactivated TDI dimer, melting point of >145° C., NCO content of about 8% by weight, Covestro Deutschland AG, Leverkusen Desmodur® Z 2589:
Micronized IPDI trimer, NCO content about 17% by weight, particle size d50 about 1.5 m, Tg+65° C., Covestro Deutschland AG, Leverkusen Jeffamine T-403:
Polyoxypropylenetriamine, molecular weight of about 440 g/mol, Huntsman Performance Products GmbH, Hamburg BorchiGel L 75N:
Polyurethane-based liquid thickener, Borchers GmbH, Langenfeld BorchiGel ALA:
Polyacrylate-based liquid thickener, Borchers GmbH, Langenfeld Tamol NN 4501:
Condensation product of 2-naphthalenesulfonic acid, 45% by weight in water, BASF AG, 67056 Ludwigshafen, Germany Lucramul 1820-Liq:
Aqueous solution of stearyl alcohol polyglycol ether, LEVACO Chemicals GmbH, Leverkusen Polyester Diol 1:
Semicrystalline polyester of sebacic acid and butane-1,4-diol, OH number 59.0, melting temperature 61° C.

Polyester Diol 2:
Semicrystalline polyester of sebacic acid and ethylene glycol, OH number 58.0, melting temperature 76° C.

Polyester Diol 3:
Semicrystalline polyester of adipic acid and 1,4-dimethylolcyclohexane, OH number 50.9, melting temperature 79.8° C.

Polyester Diol 4:
Semicrystalline polyester of a mixture of 70 mol % succinic acid and 30 mol % adipic acid and butane-1,4-diol, OH number 52.4, melting temperature 79.8° C.

PUD 1 (Comparative):
Polyurethane dispersion from Covestro Deutschland AG, Leverkusen, solids content about 50% by weight, isocyanate-reactive polymer composed of linear polyurethane chains. The polymer crystallized after the drying of the dispersion and cooling of the film to +23° C. Measurement by DSC indicated that the polyurethane polymer had a melting point of +47° C. and an enthalpy of fusion of 56 J/g.

PUD 2 (Comparative):
Polyurethane dispersion from Covestro Deutschland AG, Leverkusen, solids content about 50% by weight, isocyanate-reactive polymer composed of linear polyurethane chains. The polymer crystallized after the drying of the dispersion and cooling of the film to +23° C. Measurement by DSC indicated that the polyurethane polymer had a melting point of +47° C. and an enthalpy of fusion of 42 J/g.

Preparation of PUD 3 (Inventive):

382.28 g of polyester diol 1 were dewatered at 110° C. and 15 mbar for 1 hour. 20.14 g of isophorone diisocyanate (IPDI) and 30.11 g of hexamethylene diisocyanate (HDI) were subsequently added at 80° C. The mixture was stirred at 80° C. for 1 hour and subsequently stirred at 95° C. until an isocyanate content of 1.36% by weight had been achieved. The reaction mixture was dissolved in 650 g of acetone and cooled to 50° C. The homogeneous solution was admixed with a solution of 8.86 g of the sodium salt of N-(2-aminoethyl)-2-aminoethanesulfonic acid and 0.90 g of diethanolamine in 80 g of water with vigorous stirring. After 30 minutes, the mixture was dispersed by addition of 590 g of water. After distillative separation of the acetone, 25.5 g of Lucramul 1820-liq were added with stirring. A stable aqueous polyurethane-polyurea dispersion having a solids content of 40.2% by weight was obtained. The dried polymer had a melting temperature of 57.5° C. and an enthalpy of fusion of 69.0 J/g.

Preparation of PUD 4 (Inventive):

386.80 g of polyester diol 2 were dewatered at 110° C. and 15 mbar for 1 hour. 20.14 g of isophorone diisocyanate (IPDI) and 30.11 g of hexamethylene diisocyanate (HDI) were subsequently added at 80° C. The mixture was stirred at 80° C. until an isocyanate content of 1.20% by weight was reached. The reaction mixture was dissolved in 656 g of acetone and cooled to 50° C. The homogeneous solution was admixed with a solution of 8.86 g of the sodium salt of N-(2-aminoethyl)-2-aminoethanesulfonic acid and 0.90 g of diethanolamine in 80 g of water with vigorous stirring. After 30 minutes, the mixture was dispersed by addition of 600 g of water having a temperature of 60° C. After distillative separation of the acetone, 23.0 g of Lucramul 1820-liq were added with stirring. A stable aqueous polyurethane-polyurea dispersion having a solids content of 39.7% by weight was obtained. The dried polymer had a melting temperature of 59.5° C. and an enthalpy of fusion of 65.9 J/g.

Preparation of PUD 5 (Inventive):

330.60 g of polyester diol 3 were dewatered at 110° C. and 15 mbar for 1 hour. 15.10 g of isophorone diisocyanate (IPDI) and 22.58 g of hexamethylene diisocyanate (HDI) were subsequently added at 80° C. The mixture was heated to 90° C. and stirred at 90° C. until an isocyanate content of 1.16% by weight had been achieved. The reaction mixture was dissolved in 550 g of acetone at 90° C. and subsequently cooled to 50° C. The homogeneous solution was admixed with a solution of 5.62 g of the sodium salt of N-(2-aminoethyl)-2-aminoethanesulfonic acid and 1.93 g of diethanolamine in 55 g of water with vigorous stirring. After 30 minutes, the mixture was dispersed by addition of 520 g of water having a temperature of 50° C. After distillative separation of the acetone, 19.29 g of Lucramul 1820-liq were added with stirring. A stable aqueous polyurethane-polyurea dispersion having a solids content of 40.2% by weight was obtained. The dried polymer had a melting temperature of 60.9° C. and an enthalpy of fusion of 26.4 J/g.

Preparation of PUD 6 (Inventive):

321.15 g of polyester diol 4 were dewatered at 110° C. and 15 mbar for 1 hour. 15.10 g of isophorone diisocyanate (IPDI) and 22.58 g of hexamethylene diisocyanate (HDI) were subsequently added at 80° C. The mixture was heated to 90° C. and stirred at 90° C. until an isocyanate content of 1.18% by weight had been achieved. The reaction mixture was dissolved in 540 g of acetone at 90° C. and subsequently cooled to 50° C. Into the homogeneous solution is added a solution of 5.62 g of the sodium salt of N-(2-aminoethyl)-2-aminoethanesulfonic acid and 1.93 g of diethanolamine in 55 g of water with vigorous stirring. After 30 minutes, the mixture was dispersed by addition of 502 g of water having a temperature of 50° C. After distillative separation of the acetone, 19.94 g of Lucramul 1820-liq were added with stirring. A stable aqueous polyurethane-polyurea dispersion having a solids content of 39.9% by weight was obtained. The dried polymer had a melting temperature of 69.1° C. and an enthalpy of fusion of 69.8 J/g.

TABLE 1

Melting points of the polyurethane-polyurea polymers

| Polyurethane-polyurea polymer of | Melting point [° C.] |
|---|---|
| PUD 1 (comparative) | 48.9 |
| PUD 2 (comparative) | 46.9 |
| PUD 3 | 57.5 |
| PUD 4 | 59.5 |
| PUD 5 | 60.0 |
| PUD 6 | 69.1 |

Preparation of the Adhesive Dispersions:

The respective PUD was initially charged in a stainless steel beaker (diameter=7 cm). Dispercoll BL XP 2514, Jeffamine T-403 and BorchiGel L 75 were added successively. The mixture was homogeneously mixed with a dissolver at 700 rpm for 5 minutes (diameter of dissolver disc=4 cm).

TABLE 2

Composition of adhesive dispersions:

| Example | PUD | Amount of PUD [g] | Amount of Dispercoll ® BL XP 2514 [g] | Amount of Jeffamine T-403 [g] | Amount of BorchiGel L75 [g] |
|---|---|---|---|---|---|
| V1 | 1 | 100 | 7 | 0.15 | 0.4 |
| V2 | 2 | 100 | 7 | 0.15 | 0.4 |
| 3 | 3 | 100 | 7 | 0.15 | 0.4 |
| 4 | 4 | 100 | 7 | 0.15 | 0.4 |
| 5 | 5 | 100 | 7 | 0.15 | 0.4 |
| 6 | 6 | 100 | 7 | 0.15 | 0.4 |

V Comparative examples

Production of the Polymer Samples for Oscillation Rheometry:

7 g of the respective adhesive dispersion from examples 1 to 6 were added to a Teflon dish (diameter=7 cm). After drying of the adhesive dispersion for 1 week under standard climactic conditions at 23° C. and 50% relative humidity, polymer films of about 0.8 mm in thickness were formed. The first measurement of the polymer films in the oscillation rheometer was carried out immediately after drying. The dried polymer films were stored at 55° C. for 5 months. Samples of the stored polymer films were analyzed in the rheometer on a monthly basis.

Oscillation Rheometry:

Measurement was commenced immediately after insertion of the sample into the measurement unit of the ARES rheometer, which measurement unit had been heated to 120° C. The average values were calculated from the storage modulus values for the first 60 seconds after commencement of the measurements. The crosslinking of the polymer during storage is apparent from the increase in the G' average values. If the G' average value increases to a value≥200% based on the starting value of the sample immediately after production of the reactive adhesive sample, the polymer sample is considered crosslinked to such an extent that wetting of the substrate surfaces by the molten polymer can no longer be ensured.

TABLE 3

Percentage change in G' average values (60 sec.) at 120° C.

| Example | 1 month | 2 months | 3 months | 4 months | 5 months |
|---|---|---|---|---|---|
| V1 | 100 | 128 | 223 | — | — |
| V2 | 483 | — | — | — | — |
| 3 | 120 | 108 | 115 | 79 | 105 |
| 4 | 53 | 66 | 70 | 49 | 86 |
| 5 | 82 | 129 | 103 | — | — |
| 6 | 102 | 132 | 112 | 113 | 89 |

In the comparative examples V1 and V2 the G' average values from the oscillation measurements at 120° C./1 Hz undergo doubling after as little as one to three months of storage at 55° C. The samples of inventive examples 3 to 6 remain stable.

The storage modulus values of the reactive adhesive polymers of inventive examples 3 and 6 do not exceed the threshold value of 200% during storage at 55° C. Accordingly, storage temperatures above 55° C. are in principle possible with the inventive reactive adhesive polymers.

The invention claimed is:

1. An aqueous dispersion containing at least one semicrystalline polyurethane-polyurea polymer and at least one surface-deactivated polyisocyanate, wherein the melting temperature of the at least one semicrystalline polyurethane-polyurea polymer is at least 55° C.,
   wherein the at least one semicrystalline polyurethane-polyurea polymer is formed from
   A(i) at least one crystalline or semicrystalline difunctional polyester polyol having a number-average molecular weight of at least 400 g/mol and a melting temperature of at least 55° C.,
   A(ii) optionally at least one difunctional polyol component having a number-average molecular weight of 62 to 399 g/mol,
   A(iii) at least one isocyanate component,
   A(iv) at least one isocyanate-reactive component bearing at least one ionic or potentially ionic group and
   A(v) optionally further isocyanate-reactive components, and
   wherein the at least one semicrystalline polyurethane-polyurea polymer contains 50% to 95% by weight of constituent A(i), 0% to 10% by weight of constituent A(ii), 4% to 25% by weight of constituent A(iii), 0.5% to 10% by weight of constituent A(iv) and 0% to 30% by weight of constituent A(v), wherein the constituents sum to 100% by weight.

2. The dispersion according to claim 1, wherein the at least one surface-deactivated polyisocyanate is a dimerization or trimerization product of isophorone diisocyanate, bis(4-isocyanatocyclohexyl) methane, ω,ω'-diisocyanato-1,3-dimethylcyclohexane (H6XDI) and mixtures of these dimerization products and trimerization products and also mixed trimers of isophorone diisocyanate/bis(4-isocyanatocyclohexyl) methane, isophorone diisocyanate/hexamethylene diisocyanate, bis(4-isocyanatocyclohexyl) methane/hexamethylene diisocyanate, bis(4-isocyanatocyclohexyl) methane/ω,ω'-diisocyanato-1,3-dimethylcyclohexane or isophorone diisocyanate/ω,ω'-diisocyanato-1,3-dimethylcyclohexane.

3. The dispersion according to claim 1, wherein synthesis component A(iii) is selected from the group consisting of hexamethylene diisocyanate (HDI), 1-isocyanato-3,3,5-trimethyl-5-isocyanatomethylcyclohexane (IPDI) and mixtures thereof.

4. The dispersion according to claim 1, containing 15% to 60% by weight of the at least one semicrystalline polyurethane-polyurea polymer, 0.2% to 30% by weight of the at least one surface-deactivated polyisocyanate and 40% to 85% by weight of water, wherein the amounts of the components present in each case sum to 100% by weight.

5. The dispersion according to claim 1, wherein the at least one surface-deactivated polyisocyanate comprises at least one surface-deactivated solid polyisocyanate.

6. A process for preparing the aqueous dispersion according to claim 1 by mixing an aqueous dispersion of the at least one semicrystalline polyurethane-polyurea polymer with at least one surface-deactivated polyisocyanate.

7. The process according to claim 6, wherein additives are additionally added.

8. A method for producing coated substrates comprising providing the aqueous dispersion according to claim 1.

9. A method for producing adhesive films comprising providing the aqueous dispersion according to claim 1.

10. A flat or three-dimensional substrate coated with the aqueous dispersion according to claim 1.

11. An adhesive film comprising the aqueous dispersion according to claim 1.

12. A dried adhesive film obtained from the aqueous dispersion according to claim 1.

* * * * *